(12) United States Patent
Semba et al.

(10) Patent No.: US 8,696,835 B2
(45) Date of Patent: Apr. 15, 2014

(54) AUSTENITIC STAINLESS STEEL FOR HYDROGEN GAS AND A METHOD FOR ITS MANUFACTURE

(75) Inventors: Hiroyuki Semba, Sanda (JP); Masaaki Igarashi, Sanda (JP); Tomohiko Omura, Kishiwada (JP); Mitsuo Miyahara, Kobe (JP); Kazuhiko Ogawa, Nishinomiya (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 177 days.

(21) Appl. No.: 12/953,576

(22) Filed: Nov. 24, 2010

(65) Prior Publication Data

US 2011/0064649 A1    Mar. 17, 2011

Related U.S. Application Data

(63) Continuation of application No. 11/297,418, filed on Dec. 9, 2005, now abandoned, which is a continuation of application No. PCT/JP2004/008380, filed on Jun. 9, 2004.

(30) Foreign Application Priority Data

Jun. 10, 2003   (JP) .................................. 2003-165670

(51) Int. Cl.

| | | |
|---|---|---|
| *C22C 38/40* | (2006.01) | |
| *C22C 38/00* | (2006.01) | |
| *C22C 38/02* | (2006.01) | |
| *C22C 38/44* | (2006.01) | |
| *C22C 38/58* | (2006.01) | |

(52) U.S. Cl.
CPC ................... *C22C 38/001* (2013.01); *C22C 38/02* (2013.01); *C22C 38/44* (2013.01); *C22C 38/58* (2013.01)
USPC ....... 148/610; 206/6; 141/4; 420/53

(58) Field of Classification Search
CPC ...... C22C 38/001; C22C 38/02; C22C 38/44; C22C 38/58
USPC .......................................................... 148/610
See application file for complete search history.

(56) References Cited

U.S. PATENT DOCUMENTS

| | | |
|---|---|---|
| 4,421,572 A | 12/1983 | Bates et al. |
| 4,576,641 A | 3/1986 | Bates et al. |
| 5,634,365 A | 6/1997 | Buret et al. |
| 5,636,544 A | 6/1997 | Tomizawa et al. |
| 6,485,679 B1 | 11/2002 | Sundstrom et al. |

FOREIGN PATENT DOCUMENTS

| | | |
|---|---|---|
| EP | 0644001 A1 | 3/1995 |
| JP | 05-065601 | 3/1993 |

(Continued)

OTHER PUBLICATIONS

Andreas Zuttel, Materials for Hydrogen Storage, Materials Today, Sep. 2003, pp. 24-33.*

(Continued)

*Primary Examiner* — Jessee Roe
*Assistant Examiner* — Christopher Kessler
(74) *Attorney, Agent, or Firm* — Clark & Brody

(57) ABSTRACT

An austenitic stainless steel for use in a hydrogen gas atmosphere comprises, in mass %, C: 0.10% or less, Si: 1.0% or less, Mn: 0.01 to 30%, P: 0.040% or less, S: 0.01% or less, Cr: 15 to 30%, Ni: 5.0 to 30%, Al: 0.10% or less, N: 0.001 to 0.30% with the balance Fe and inevitable impurities. An X-ray (111) integration intensity of a cross section along the direction rectangular to the working direction is five times that in a random direction or less, and the X-ray integration intensity ratio of a cross section along the working direction satisfies $I(220)/I(111) \leq 10$. The high strength steel can also contain one or more of the groups of Mo and W; V, Nb, Ta, Ti, Zr and Hf; B; Cu and Co; Mg, Ca, La, Ce, Y, Sm, Pr and Nd.

17 Claims, 3 Drawing Sheets

(56) References Cited

FOREIGN PATENT DOCUMENTS

| JP | 05-098391 | 4/1993 |
|---|---|---|
| JP | 07-026350 | 1/1995 |
| JP | 7-216453 | 8/1995 |
| JP | 2001-049400 | 2/2001 |

OTHER PUBLICATIONS

D.N. Wasnik, et al., "Resistance to sensitization and intergranular corrosion through extreme randomization of grain boundaries", Acta Materialia 50 (2002) pp. 4587-4601.

M. Wrobel, et al., "Microstructural Changes Due to Rolling of Austenitic Stainless Steel Single Crystals With Initial Orientation (110) [001] and (110) [110]", Scripta Mateallurgica et Materialia, vol. 32, No. 12 (1995) pp. 1985-1991.

A. Padilha, et al., "Annealing of Cold-worked Austenitic Stainless Steels", ISIJ International, vol. 43 (2003), No. 2, pp. 135-143.

N. Batista de Lima, et al., "Deformation and Recrystallization Textures in Duplex Stainless Steel", Materials Science Forum, vols. 408-412 (2002), pp. 1353-1358.

* cited by examiner

AUSTENITIC STAINLESS STEEL FOR HYDROGEN GAS AND A METHOD FOR ITS MANUFACTURE

CROSS-REFERENCE TO RELATED APPLICATIONS

This application is a continuation of application Ser. No. 11/297,418 filed Dec. 9, 2005, now abandoned, which in turn is a continuation of international application PCT/JP04/08380 filed on Jun. 9, 2004, and claims priority to Japanese application 2003-165670 filed Jun. 10, 2003.

TECHNICAL FIELD

This invention relates to a stainless steel for use in a hydrogen gas environment which has excellent mechanical properties (strength and ductility) and corrosion resistance and to a method for its manufacture. In addition, the present invention relates to equipment used in a hydrogen gas environment such as piping, gas cylinders, and valves for hydrogen gas made from such a stainless steel.

A stainless steel according to the present invention is particularly suitable as a steel for structural equipment which is exposed to a high pressure hydrogen gas environment in fuel cell automobiles and hydrogen gas stations, and particularly for piping, gas cylinders, and valves.

BACKGROUND ART

As is well known, fuel cell automobiles obtain electric power using hydrogen and oxygen as fuels. They have attracted attention as the next generation of clean automobiles which do not discharge carbon dioxide ($CO_2$) or harmful substances such as nitrogen oxides ($NO_x$) or sulfur oxides ($SO_x$) as do conventional gasoline-powered or diesel-powered automobiles. In Japan, under the guidance of the Ministry of Economy, Trade, and Industry, it is planned to introduce 5 million vehicles by the year 2020.

At present, the biggest problem with respect to fuel cell automobiles is how to realize the practical generation and storage of hydrogen as a fuel, and various types of research and development are being pursued.

Conventional methods thereof include a method in which a hydrogen gas cylinder is directly mounted on a vehicle, a method in which methanol or gasoline is reformed to obtain hydrogen by a reformer mounted on a vehicle, and a method in which a hydrogen-storing alloy which can absorb hydrogen is mounted on a vehicle.

Each of these methods has strengths and weaknesses, but in Japan, in December of 2002, the first fuel cell automobile in the world having a hydrogen gas cylinder mounted thereon was sold, and a number of the vehicles are already being used as government vehicles by the Ministry of Land, Infrastructure, and Transport, for example.

However, although present fuel cell automobiles have a maximum speed of approximately 150 km per hour and an output of approximately 100 horsepower which is close to the performance of a gasoline-powered automobile used as a private vehicle, due to limitations on the size of gas cylinders, the distance for which they can continuously run is at most only 300 km, and this is an impediment towards their general use.

At present, an increasing amount of research and development is being carried out for promoting the spread of fuel cell automobiles as the next generation of clean automobile by improving and lowering the cost of fuel cell automobiles having a high pressure hydrogen gas cylinder mounted thereon. To achieve these goals, it is necessary to overcome the following problems.

Namely, there are problems such as lengthening the continuous running distance, providing infrastructure such as gas stations, and developing safer technology for hydrogen.

It is calculated that in order to increase the running distance to 500 km, for example, it is necessary to increase the pressure of hydrogen in a vehicle-mounted gas cylinder from the present value of 35 MPa to 70 MPa. In addition, instead of existing gasoline stations, hydrogen gas stations will be necessary. As a result, it will be necessary to provide for the generation, transport, and storage of high pressure hydrogen gas and rapid filling thereof (supply to vehicles).

Since hydrogen gas is flammable, it is necessary to exercise special care when handling it. However, there are many unknown matters concerning the interaction of ultrahigh pressure hydrogen gas exceeding 50 MPa and the structure of components of equipment, and there is a strong desire for establishment of technology for its safe utilization.

The fuel cell automobiles which were sold last year used already existing SUS316 austenitic stainless steel, the soundness of which is already widely recognized. This is because its susceptibility to hydrogen gas embrittlement in a hydrogen gas environment of up to about 35 MPa is better compared to other structural steels (such as STS480 (JIS G 3455) low carbon steel or SUS304 stainless steel) and because techniques for working and welding it are already established.

However, in order to use SUS316 steel under a hydrogen gas pressure increased from 35 MPa to 70 MPa, piping which conventionally had an outer diameter of 26.2 mm and an inner diameter of 20 mm (a pipe wall thickness of 3.1 mm) must be changed to piping having an outer diameter of 34.7 mm and an inner diameter of 20 mm (pipe wall thickness of 7.35 mm), since the conventional material does not have sufficient strength unless its wall thickness is at least doubled and its weight is at least 3 times as large. Therefore, a large increase in the weight mounted on a vehicle and an increase in the size of hydrogen gas stations are unavoidable. These are great impediments to its practical application.

As disclosed in Japanese Published Unexamined Patent Applications Hei 5-98391, Hei 5-65601, Hei 7-216453, and Hei 7-26350, for example, it is generally known that the strength of usual austenitic stainless steel can be improved by cold working, and that it is possible to increase the strength and reduce the wall thickness of a pipe by drawing or by rolling.

FIG. 1 is a graph showing a typical relationship between the degree of cold working (percent reduction in cross section) and tensile strength. It can be seen therefrom that a high strength can be realized by increasing the degree of cold working.

DISCLOSURE OF THE INVENTION

However, when strengthening is carried out by cold working in this manner, although a high strength is obtained, ductility and toughness are markedly decreased. FIG. 2 is a graph showing the relationship between the elongation in the direction perpendicular to the direction of working in cold working and the degree of cold working (hereunder referred to as "the percent reduction in cross section"). It can be seen that elongation greatly decreases as the degree of cold working increases. In actual practice, elongation of at least about 30% is desirable, but when the degree of cold working is large, a decrease in elongation becomes a problem.

Accordingly, in light of safety in handling high pressure hydrogen gas, it has been thought that cold working could not be employed to obtain a high strength.

The object of the present invention is to provide an austenitic stainless steel which has excellent mechanical properties and corrosion resistance and which can be used in a hydrogen gas environment such as one containing high pressure hydrogen gas at 70 MPa or above and to provide a method for its manufacture.

The present inventors studied the causes of a degradation in mechanical properties accompanying working of various types of austenitic stainless steels in detail. As a result of detailed study of the effects of the chemical composition and the metallic structure (the microstructure) of a material on a deterioration in mechanical properties, including hydrogen embrittlement in a high pressure hydrogen gas environment such as at least 70 MPa, and on corrosion resistance, they obtained the following new knowledge.

(1) When an austenitic stainless steel is subjected to cold working, its strength increases, but when cold working is performed in one direction, a strong anisotropy of mechanical properties develops. In particular, the ductility and toughness and torsional properties markedly decrease in the direction perpendicular to the direction of working.

(2) When an excessive amount of dislocations are introduced into austenitic stainless steel, it is thought that penetration of hydrogen into the steel is difficult compared to conventional ferritic steel. However, in a high pressure hydrogen gas environment, penetration of hydrogen is easily enabled, and susceptibility to hydrogen embrittlement increases. In addition, it was found that if the susceptibility to hydrogen embrittlement in the direction of working is compared to that in the direction perpendicular to the direction of working, the susceptibility to hydrogen embrittlement is markedly increased in the direction perpendicular to the direction of working.

FIG. 3 is a graph showing the relationship between the degree of cold working and hydrogen embrittlement in the direction of working and the direction perpendicular thereto. The above-described tendency is clear therefrom.

(3) With an austenitic stainless steel, if strength is increased by cold working, a texture structure is achieved as the degree of cold working increases. In usual cold rolling, a rolled texture structure is formed such that $\{112\}$ is parallel to the rolling surface and $<11\bar{1}>$ is parallel to the direction of working (rolling), or such that $\{110\}$ is parallel to the rolling surface and $<001>$ is parallel to the direction of working. With pipes or wires or forged materials, a fiber texture structure is formed in which $<11\bar{1}>$ or $<001>$ is parallel to the direction of working (elongation).

Namely, if it is attempted to give an austenitic stainless steel a high strength by conventional cold working methods, in every situation, the texture structure in which $<11\bar{1}>$ or $<001>$ is parallel to the direction of working (elongation) is inevitably formed.

Formation of such a texture structure can be measured by measurement of the x-ray integrated intensity I(hkl) (h, k, and l are Miller indices) obtained by x-ray diffraction of the rolling surface. The degree of formation of the above-described texture structure can be obtained by measurement of the x-ray integrated intensity I(111) or I(002) for a cross section perpendicular to the direction of working.

(4) The susceptibility to hydrogen embrittlement in the direction of working increases as the degree of formation of the x-ray integrated intensity I(111) of a cross section perpendicular to the direction of working increases. When the degree of the formation thereof exceeds 5, the susceptibility to hydrogen embrittlement indicated by elongation (hydrogen)/elongation (air) becomes ≤0.75. In other words, if the degree of formation of a cross section perpendicular to the direction of working is made 5 or less, susceptibility to hydrogen embrittlement in the direction of working can be decreased. Here, elongation (hydrogen) means the elongation in a tensile test in a hydrogen gas environment, and elongation (air) means the elongation in a tensile test in air.

FIG. 4 is a graph showing the relationship between the x-ray integrated intensity I(111) of a cross section perpendicular to the direction of working and resistance to hydrogen embrittlement for the direction of working and the direction perpendicular thereto. From FIG. 4, it can be seen that the resistance to hydrogen embrittlement in the direction of working has a strong correlation to the x-ray integrated intensity I(111).

(5) Although susceptibility to hydrogen embrittlement in the direction perpendicular to the direction of working has a correlation to the x-ray integrated intensity I(111) of a cross section perpendicular to the direction of working, it has an extremely strong correlation to the x-ray integrated intensity I(220) and the x-ray integrated intensity I(111) of a cross section in the direction of working. When the ratio I(220)/I(111) exceeds 10, susceptibility to hydrogen embrittlement enormously increases (susceptibility to hydrogen embrittlement as expressed by elongation (hydrogen)/elongation (air) ≤0.75). In other words, if the x-ray integrated intensity ratio I(220)/I(111) of a plane in the direction of working is made 10 or less, susceptibility to hydrogen embrittlement perpendicular to the direction of working can be decreased.

FIG. 5 is a graph showing the relationship between the x-ray integrated intensity ratio I(220)/I(111) of a cross section in the direction of working and resistance to hydrogen embrittlement for the direction of working and the direction perpendicular thereto. From FIG. 5, it can be seen that hydrogen embrittlement in the direction perpendicular to the direction of working has a strong correlation to the x-ray integrated intensity ratio I(220)/I(111).

(6) By working a material in a series of steps of deformation which are not employed by conventional working methods, a specific texture structure is developed, and as a result, it is possible to manufacture an austenitic stainless steel having an extremely low susceptibility to hydrogen embrittlement in a high pressure hydrogen gas environment.

Namely, by carrying out plastic working with a reduction in cross section of 10-50% in a temperature range from room temperature to 200° C. and then performing plastic working of at least 5% in a direction different from the direction of working of the above-described plastic working on an austenitic stainless steel having a specific composition to be described below, the x-ray integrated intensity I(111) of a cross section perpendicular to the direction of working can be suppressed to at most 5 times that of a random direction, and the x-ray integrated intensity ratio I(220)/I(111) of a cross section in the direction of working can be suppressed to at most 10. As a result, it is possible to markedly decrease susceptibility to hydrogen embrittlement.

Here, "the direction of working" does not mean "the direction of plastic working itself" but means "the direction of plastic deformation of the material being worked".

(7) Summarizing the above, when applying cold working to an austenitic stainless steel having a composition described below, to limit the x-ray integrated intensity I(111) of a cross section perpendicular to the direction of working to at most 5 times that of a random direction and limiting the x-ray integrated intensity ratio I(220)/I(111) of a cross section in the direction of working to at most 10, it is possible to obtain an austenitic stainless steel which in spite of having a high strength has excellent toughness and reduced susceptibility to hydrogen embrittlement and low anisotropy and which can be used in a hydrogen gas environment at a high pressure such as 70 MPa or above.

Thus, the present invention is an austenitic stainless steel for hydrogen gas having a chemical composition comprising, in mass percent, C: at most 0.10%, Si: at most 1.0%, Mn: 0.01-30%, P: at most 0.040%, S: at most 0.01%, Cr: 15-30%, Ni: 5.0-30%, Al: at most 0.10%, N: 0.001-0.30%, and a remainder of Fe and impurities and having a structure such that the x-ray integrated intensity I(111) of a cross section perpendicular to the direction of working is at most 5 times that of a random direction and such that the x-ray integrated intensity ratio I(220)/I(111) of a cross section in the direction of working is at most 10.

The direction of working herein means the direction of plastic deformation of the material being worked.

The above-described chemical composition according to the present invention may further include at least one element selected from the following groups.

(1) At least one of Mo: 0.3-3.0% and W: 0.3-6.0%.
(2) At least one of V: 0.001-1.0%, Nb: 0.001-1.0%, Ta: 0.001-1.0%, Ti: 0.001-1.0%, Zr: 0.001-1.0%, and Hf: 0.001-1.0%.
(3) B: 0.0001-0.020%
(4) At least one of Cu: 0.3-2.0% and Co: 0.3-5.0%.
(5) At least one of Mg: 0.0001-0.0050%, Ca: 0.0001-0.0050%, La: 0.0001-0.20%, Ce: 0.0001-0.20%, Y: 0.0001-0.40%, Sm: 0.0001-0.40%, Pr: 0.0001-0.40%, and Nd: 0.0001-0.50%.

In a preferred mode of the present invention, the average austenite grain diameter is at most 20 μm.

In order to manufacture an austenitic stainless steel for hydrogen gas according to the present invention, an austenitic stainless steel having the above-described chemical composition is subjected to plastic working with a reduction in cross section of 10-50% in a temperature range from room temperature to 200° C., and then plastic working of at least 5% is carried out in a direction different from the direction of working of the above-described plastic working.

In this manner, according to the present invention, it is possible to obtain a high strength austenitic stainless steel which does not undergo hydrogen embrittlement even in a high pressure hydrogen gas environment such as 70 MPa or above and which does not have anisotropy of mechanical properties. It exhibits particularly excellent properties in vessels, piping, valves, and the like which are used in a hydrogen gas station or a fuel cell automobile and are exposed to a high pressure hydrogen gas environment.

BEST FORM FOR CARRYING OUT THE INVENTION

Figure 1:
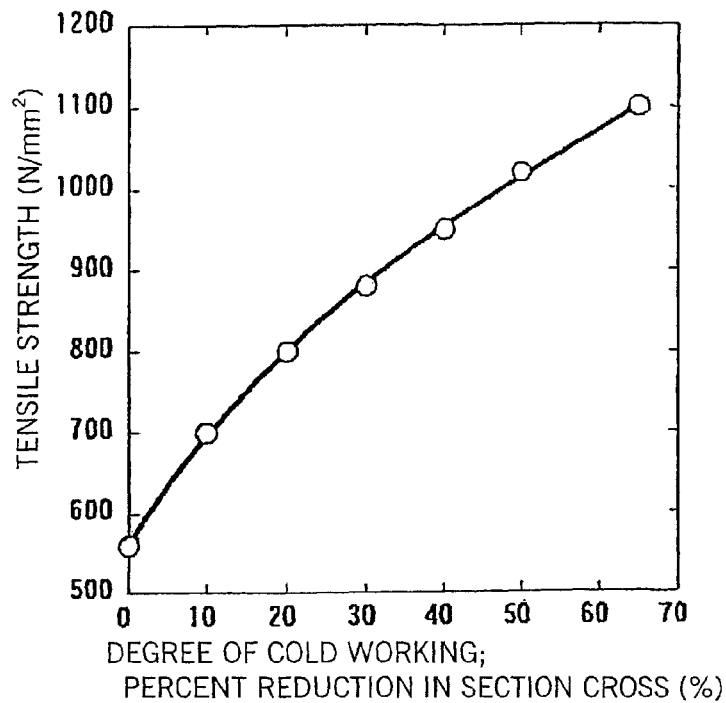
FIG. 1 is a view showing the relationship between the degree of cold working and the tensile strength of a conventional steel.
Figure 2:
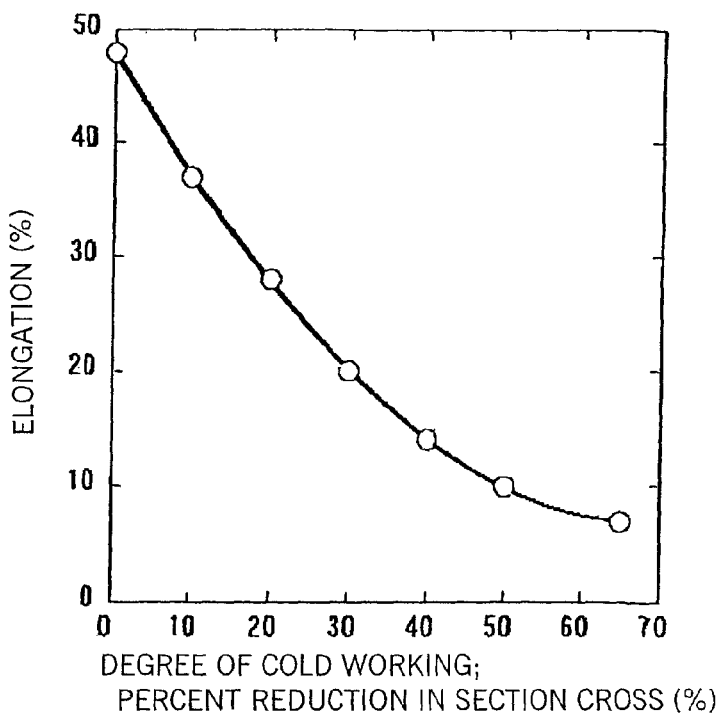
FIG. 2 is a view showing the relationship between the degree of cold working and the elongation of a conventional steel.
Figure 3:
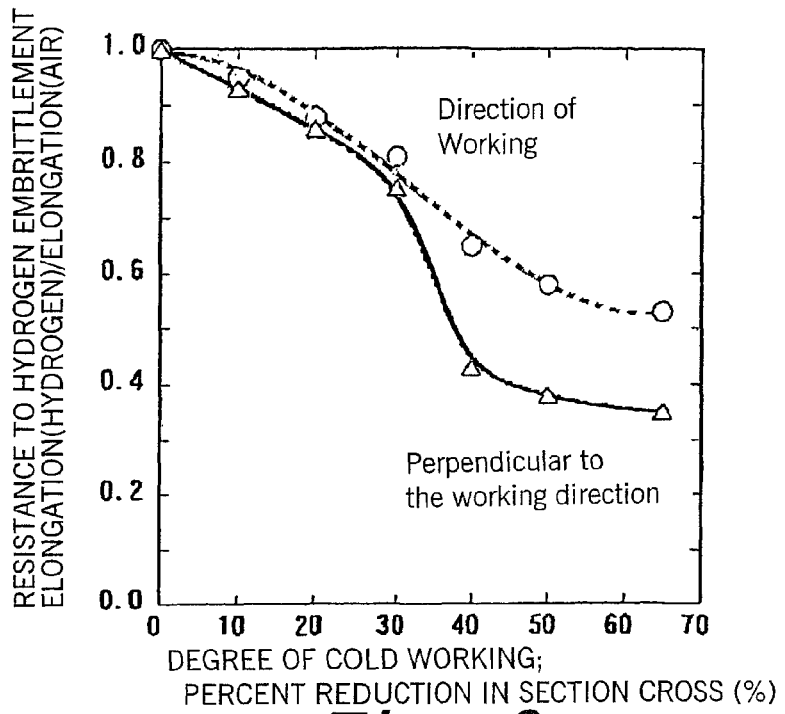
FIG. 3 is a view showing that the resistance to hydrogen embrittlement in the direction of working greatly differs from that in the direction perpendicular to the direction of working.
Figure 4:
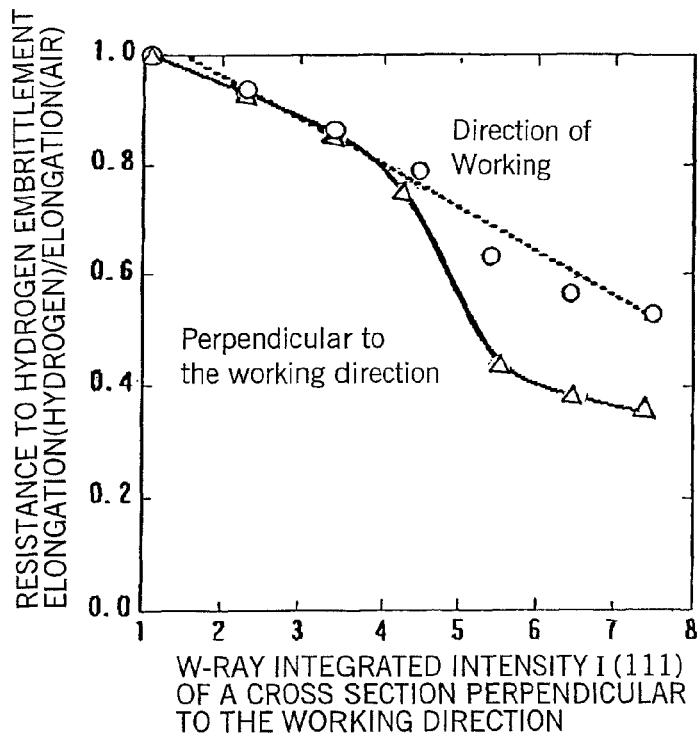
FIG. 4 is a view showing that the resistance to hydrogen embrittlement in the direction of working has a strong correlation to the x-ray integrated intensity I(111) of a cross section in a direction perpendicular to the direction of working.
Figure 5:
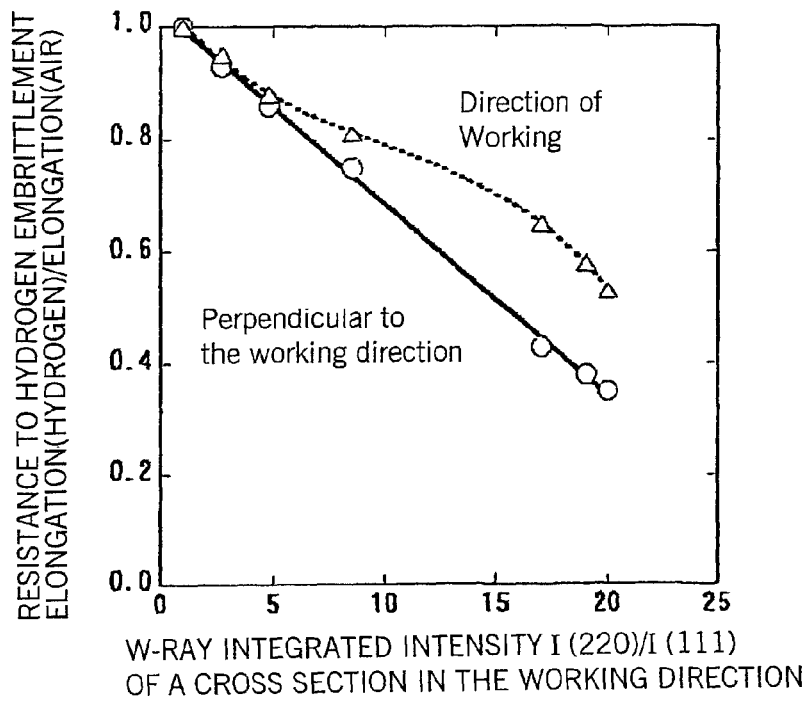
FIG. 5 is a view showing that the resistance to hydrogen embrittlement in the direction perpendicular to the direction of working has a strong correlation to the x-ray integrated intensity I(220)/I(111) of a cross section in the direction of working.

The chemical composition of an austenitic stainless steel according to the present invention and the reasons for limits thereon will be explained below in detail. In this specification, percent with respect to the chemical composition of steel means mass percent unless otherwise specified.

The content of C is made at most 0.10%. In an austenitic stainless steel, there are often cases in which corrosion resistance is increased by precipitation of $M_{23}C_6$-type carbides (M is Cr, Mo, Fe, or the like) or MC-type carbides (M is Ti, Nb, Ta, or the like), but in a steel according to the present invention, precipitation of carbides is not mandatory. Rather, there are cases in which precipitation at grain boundaries has an adverse effect on toughness and the like after cold working. Thus, C is limited to at most 0.10%. The lower the content of C the better, and preferably it is at most 0.04%. Taking into consideration refining costs, it is not necessary to make the C content zero, and preferably it is at least 0.001%.

When at least one of below-described Nb, Ta, and Ti is included in the amounts of Nb: greater than 0.20% and at most 1.0%, Ta: greater than 0.40% and at most 1.0%, and Ti: greater than 0.10% and at most 1.0% in order to obtain a higher strength, C+N is limited to at most 0.05%.

Si is known as an element which is effective for improving corrosion resistance in various environments, but if a large amount thereof is added, it forms intermetallic compounds with Ni, Cr, and the like, it promotes the formation of sigma phase and other intermetallic compounds, and there are cases in which it markedly lowers hot workability. Therefore, the content of Si is made at most 1.0% and preferably at most 0.5%. In the same manner as for C, taking into consideration the refining costs of Si, it is not necessary to make the content of Si zero, and preferably it is at least 0.001%.

Mn is not only effective in minute amounts as a deoxidation and desulfurization agent, but in addition, there are cases in which it is added in large amounts as an inexpensive austenite stabilizing element. In the steel of the present invention, by appropriate combinations thereof with Cr, Ni, N, and the like, it contributes to high strength and increased ductility and toughness. Therefore, Mn is added in an amount of at least 0.01%. However, if it exceeds 30%, there are cases in which hot workability and weathering resistance decrease, so it is made 0.01-30%. Preferably it is 0.1-20%.

Cr is essential as an element for improving corrosion resistance in the above-described environment of use, so it is included in an amount of at least 15%. However, if a large amount is added, a large amount of nitrides such as CrN and $Cr_2N$ or $M_{23}C_6$-type carbides are formed, so the content of Cr is made 15-30%. Preferably it is 15-27%.

Ni is added as an austenite stabilizing element, but in the steel of the present invention, when it is suitably combined with Cr, Mn, N, or the like, it contributes to high strength and improvements in ductility and toughness in the direction perpendicular to the direction of working. Therefore, Ni is added in an amount of at least 5.0%. From the standpoint of costs, it is undesirable to add it in excess of 30%, so it is made 5.0-30%. Preferably it is 6-23%.

The content of Al is made at most 0.10%. Al is an important element as a deoxidizing agent. However, if a large amount remains in excess of 0.10%, it promotes the formation of sigma phase and other intermetallic compounds, which is undesirable from the standpoint of achieving the strength and toughness which are the objects of the present invention.

N is an important solid solution strengthening element. When it is included in a suitable range in conjunction with Mn, Cr, Ni, C, and the like, it suppresses the formation of sigma phase and other intermetallic compounds, and it contributes to an increase in toughness, particularly in the direction perpendicular to the direction of working. For this purpose at least 0.001% is added. However, if it is added in excess of 0.30%, cold workability decreases, so it is made 0.001-0.30%. When at least one of below-described Nb, Ta, and Ti is added in the range of Nb: greater than 0.20% and at most 1.0%, Ta: greater than 0.40% and at most 1.0%, and Ti: greater than 0.10% and at most 1.0% with the object of obtaining a higher strength, C+N is restricted to a range of at most 0.05%.

Mo and W contribute to obtaining a high strength as solid solution strengthening elements, so at least one thereof may be added as necessary. However, if a large amount thereof is added, they destabilize austenite, so when adding Mo or W, the amounts thereof are made Mo: 0.3-3.0% and W: 0.3-6.0%.

V, Nb, Ta, Ti, Zr, and Hf form cubic carbonitrides and contribute to an increase in strength, and if necessary at least one of these may be added. However, if a large amount of carbonitrides thereof precipitate, ductility and toughness in the direction perpendicular to the direction of working decrease, and the contents thereof in the steel according to the present invention are each made 0.001-1.0%.

When it is desired to obtain a higher strength, at least one of Nb, Ta, and Ti is contained in the ranges of Nb: greater than 0.20% and at most 1.0%, Ta: greater than 0.40% and at most 1.0%, and Ti: greater than 0.10% and at most 1.0%, and C+N is preferably restricted to the range of at most 0.05%.

B contributes to refinement of precipitates and refinement of austenite crystal grain, and if necessary at least 0.0001% of B may be added. However, if a large amount of B is added, it forms low melting point compounds, and there are cases in which it decreases hot workability. Thus, its upper limit is made 0.020%.

Cu and Co are austenite stabilizing elements. In a steel of the present invention, when they are suitably combined with Mn, Ni, C, or Cr, they contribute to an increase in strength, and optionally, at least one thereof may be added in an amount of at least 0.3%. However, from the standpoint of costs, it is unnecessary to add a large amount thereof, and the content thereof is defined as Cu: 0.3-2.0% and Co: 0.3-5.0%.

Mg, Ca, and, of the transition elements, La, Ce, Y, Sm, Pr, and Nd act to prevent occurrence of cracks during solidification at the time of casting when present in the ranges set forth for the steel of the present invention, and they have the effect of reducing a decrease in ductility resulting from hydrogen embrittlement after long periods of use. If necessary, therefore, at least one of any of Mg: 0.0001-0.0050%, Ca: 0.0001-0.0050%, La: 0.0001-0.20%, Ce: 0.0001-0.20%, Y: 0.0001-0.40%, Sm: 0.0001-0.40%, Pr: 0.0001-0.40%, and Nd: 0.0001-0.50% may be added.

In the steel of the present invention, there is no marked deterioration in the general properties of the steel even if at most 0.040% of P and at most 0.01% of S are present as impurities. Each of these is generally known as an element which by nature has a harmful effect on ductility, workability, and the like. However, in the steel of the present invention, an impurity content of this level does not cause any problems.

An austenitic stainless steel according to the present invention has a tensile strength on the level of at least 800 MPa and preferably at least 900 MPa, and it has an elongation of at least 30%. The steel can be used in the form of plates, pipes, rods, shaped members, and wire, for example. If necessary, it can further undergo surface treatment such as plating.

In order to obtain a texture structure having a reduced anisotropy which is characteristic of the present invention, first cold working (first plastic working) having a degree of cold working of 10-50% expressed as percent reduction in cross section, and second cold working (second plastic working) in a direction of working different from that of the first cold working and having a degree of cold working of at least 5% are carried out. Some examples of methods of plastic working when preparing tubes, for example, are pipe forming by cold drawing or pipe forming by cold rolling combined with pipe expansion with a plug or pipe expansion by spinning. A combination of the above-described pipe forming and swaging in the axial direction is also effective.

There are no particular restrictions on the direction of working of the first plastic working and the direction of working of the second plastic working as long as anisotropy of the structure of a cold worked product in the present invention can be eliminated. However, considering making of steel pipes and the like, the directions of working are preferably perpendicular to each other. As already stated, the direction of working refers to the direction of plastic deformation of the material being worked. For example, when carrying out drawing of a steel pipe, the direction of working is the lengthwise direction of the steel pipe, and when carrying out swaging to compress a steel pipe, it is the radial direction of the steel pipe.

The order in which the first and second cold working are performed is usually such that the working with the larger degree of working is carried out first and then the working with the smaller degree of working is carried out. However, in the present invention, there is no particular restriction as long as prescribed shaping can be carried out and anisotropy of the structure can be eliminated.

When one or both of the first and second working is carried out in multiple steps, the steps of the first and second cold working can be suitably combined with each other. For example, at first the first cold working can be carried out a number of times, and then the direction of working can be changed and the second cold working can be carried one or more times, and then the direction can again be changed and the first cold working can be carried out, or the order may be the opposite of the above.

In the present invention, the "direction of working" when measuring the x-ray integrated intensity which evaluates the anisotropy of the metal structure can be the direction of working of either the first cold working or the second cold working as long as the requirements of the present invention are satisfied. However, for convenience, in the examples of this specification, the direction of working is the direction in which the largest cold working is carried out. Specifically, when carrying out cold working of a steel pipe, it is the lengthwise direction.

In the present invention, such a texture structure is obtained in order to improve resistance to hydrogen embrittlement, and it is sufficient to form such a texture structure at least in a surface layer portion where contact with a hydrogen gas atmosphere takes place. Accordingly, after pipe forming, it is permissible to eliminate anisotropy of the texture structure only in the surface layer portion (the inner surface or the outer surface of the pipe) by shot peening.

The effects of carrying out the present invention will be described in greater detail by examples.

EXAMPLES

Table 1 shows examples of the chemical composition (mass percent) of an austenitic stainless steel according to the present invention and of a comparative steel.

direction perpendicular to the previous direction of working (manufacturing method B) to obtain test materials.

For comparative steel A, a test material was obtained by the above-described hot forging and solid solution treatment without further processing.

TABLE 1

| | Steel | C | Si | Mn | P | S | Cr | Ni | sol-Al | N | Mo | W | others | manufacturing process |
|---|---|---|---|---|---|---|---|---|---|---|---|---|---|---|
| present invention | 1 | 0.005 | 0.39 | 1.78 | 0.018 | 0.0007 | 18.2 | 9.5 | 0.009 | 0.045 | | | | A |
| | 2 | 0.016 | 0.36 | 1.03 | 0.001 | 0.0008 | 25.6 | 20.7 | 0.011 | 0.089 | | | | B |
| | 3 | 0.018 | 0.40 | 2.36 | 0.027 | 0.0007 | 27.8 | 28.7 | 0.007 | 0.152 | | | | A |
| | 4 | 0.014 | 0.43 | 10.51 | 0.010 | 0.0008 | 18.9 | 10.3 | 0.006 | 0.281 | | | | A |
| | 5 | 0.015 | 0.47 | 15.23 | 0.019 | 0.0007 | 24.1 | 21.1 | 0.010 | 0.279 | | | | A |
| | 6 | 0.020 | 0.38 | 1.78 | 0.029 | 0.0008 | 16.4 | 12.7 | 0.009 | 0.090 | 2.14 | | | B |
| | 7 | 0.046 | 0.46 | 9.12 | 0.004 | 0.0010 | 16.8 | 13.0 | 0.006 | 0.275 | 2.46 | | | A |
| | 8 | 0.004 | 0.39 | 1.73 | 0.025 | 0.0008 | 16.5 | 12.2 | 0.005 | 0.090 | | 4.25 | | B |
| | 9 | 0.012 | 0.09 | 1.78 | 0.015 | 0.0009 | 17.1 | 12.6 | 0.009 | 0.090 | 2.63 | | 0.34V | B |
| | 10 | 0.016 | 0.41 | 1.80 | 0.018 | 0.0070 | 17.5 | 13.4 | 0.004 | 0.094 | 1.96 | | 0.55Nb | A |
| | 11 | 0.024 | 0.38 | 1.77 | 0.025 | 0.0007 | 15.6 | 11.6 | 0.003 | 0.087 | 2.87 | | 0.81Ta | B |
| | 12 | 0.015 | 0.37 | 1.10 | 0.018 | 0.0006 | 16.8 | 11.7 | 0.003 | 0.089 | | | 0.27Ti | B |
| | 13 | 0.015 | 0.38 | 1.22 | 0.019 | 0.0005 | 15.6 | 12.6 | 0.009 | 0.085 | 2.67 | | 0.12Zr | A |
| | 14 | 0.016 | 0.31 | 1.27 | 0.006 | 0.0010 | 16.7 | 12.8 | 0.004 | 0.052 | 1.97 | | 0.36Hf | B |
| | 15 | 0.017 | 0.36 | 1.19 | 0.023 | 0.0010 | 17.1 | 11.8 | 0.003 | 0.053 | 2.01 | | 0.44V + 0.29Nb | B |
| | 16 | 0.013 | 0.82 | 0.89 | 0.015 | 0.0010 | 16.6 | 12.0 | 0.005 | 0.056 | | 1.92 | 0.39Ti + 0.52Zr | A |
| | 17 | 0.018 | 0.40 | 0.95 | 0.018 | 0.0007 | 16.7 | 12.9 | 0.002 | 0.048 | 2.58 | | 0.005B | B |
| | 18 | 0.016 | 0.36 | 1.79 | 0.018 | 0.0005 | 17.0 | 12.1 | 0.008 | 0.052 | 2.57 | | 1.21Cu | A |
| | 19 | 0.013 | 0.40 | 0.96 | 0.028 | 0.0005 | 16.2 | 11.7 | 0.009 | 0.054 | 2.38 | | 3.46Co | B |
| | 20 | 0.014 | 0.38 | 0.91 | 0.027 | 0.0008 | 16.9 | 12.5 | 0.011 | 0.057 | | | 0.0032Mg | A |
| | 21 | 0.014 | 0.28 | 0.90 | 0.016 | 0.0008 | 17.2 | 13.3 | 0.011 | 0.092 | 2.33 | | 0.0044Ca | B |
| | 22 | 0.015 | 0.30 | 1.09 | 0.016 | 0.0016 | 17.0 | 12.0 | 0.015 | 0.089 | 2.07 | | 0.081La | B |
| | 23 | 0.006 | 0.33 | 0.97 | 0.027 | 0.0009 | 16.7 | 13.0 | 0.008 | 0.094 | 1.98 | | 0.059Ce | A |
| | 24 | 0.092 | 0.25 | 1.00 | 0.035 | 0.0010 | 15.9 | 12.1 | 0.007 | 0.088 | 2.04 | | 0.118Y | B |
| | 25 | 0.055 | 0.27 | 1.01 | 0.018 | 0.0007 | 15.7 | 13.0 | 0.005 | 0.093 | 2.89 | | 0.025Sm | A |
| | 26 | 0.015 | 0.27 | 0.98 | 0.017 | 0.0008 | 16.9 | 12.0 | 0.011 | 0.084 | | | 0.033Pr | B |
| | 27 | 0.014 | 0.31 | 1.49 | 0.018 | 0.0010 | 15.6 | 12.1 | 0.008 | 0.090 | 2.21 | | 0.38Nd | B |
| | 28 | 0.011 | 0.29 | 1.30 | 0.027 | 0.0008 | 16.1 | 12.9 | 0.008 | 0.087 | 2.86 | | 0.0024Ca + 0.022Y | A |
| | 29 | 0.011 | 0.36 | 1.22 | 0.027 | 0.0007 | 16.7 | 11.9 | 0.006 | 0.060 | 2.06 | | 0.030Ce + 0.081Nd | B |
| | 30 | 0.014 | 0.38 | 1.39 | 0.025 | 0.0006 | 17.5 | 12.0 | 0.012 | 0.029 | 2.63 | | 0.57Nb | A |
| | 31 | 0.017 | 0.40 | 1.78 | 0.010 | 0.0008 | 15.8 | 11.7 | 0.008 | 0.024 | 2.99 | | 0.80Ta | A |
| | 32 | 0.015 | 0.39 | 1.80 | 0.020 | 0.0007 | 17.0 | 12.5 | 0.005 | 0.023 | 1.83 | | 0.45Ti | B |
| comparative | A | 0.020 | 0.26 | 1.85 | 0.027 | 0.0007 | 17.1 | 13.1 | 0.012 | 0.054 | 2.28 | | | No cold rolling |
| | B | ↓ | ↓ | ↓ | ↓ | ↓ | ↓ | ↓ | ↓ | ↓ | ↓ | | | XX (10%) |
| | C | ↓ | ↓ | ↓ | ↓ | ↓ | ↓ | ↓ | ↓ | ↓ | ↓ | | | XX (20%) |
| | D | ↓ | ↓ | ↓ | ↓ | ↓ | ↓ | ↓ | ↓ | ↓ | ↓ | | | XX (30%) |
| | E | ↓ | ↓ | ↓ | ↓ | ↓ | ↓ | ↓ | ↓ | ↓ | ↓ | | | XX (40%) |
| | F | ↓ | ↓ | ↓ | ↓ | ↓ | ↓ | ↓ | ↓ | ↓ | ↓ | | | XX (50%) |
| | G | ↓ | ↓ | ↓ | ↓ | ↓ | ↓ | ↓ | ↓ | ↓ | ↓ | | | XX (65%) |
| | H | 0.159* | 0.28 | 1.76 | 0.028 | 0.0006 | 16.2 | 13.3 | 0.008 | 0.045 | 2.94 | | | B |
| | I | 0.021 | 0.25 | 1.84 | 0.029 | 0.0006 | 12.4* | 13.1 | 0.007 | 0.045 | 2.46 | | | B |
| | J | 0.024 | 0.34 | 1.80 | 0.028 | 0.0007 | 33.5* | 12.2 | 0.008 | 0.091 | 1.89 | | | B |
| | K | 0.019 | 0.32 | 11.56 | 0.028 | 0.0004 | 16.4 | 11.7 | 0.005 | 0.342* | 2.72 | | | B |
| | L | 0.023 | 0.38 | 1.82 | 0.029 | 0.0009 | 18.0 | 9.8 | 0.008 | 0.047 | | | | XX (40%) |
| | M | 0.014 | 0.43 | 14.89 | 0.027 | 0.0008 | 24.6 | 21.4 | 0.009 | 0.272 | | | | XX (40%) |
| | N | 0.021 | 0.35 | 1.80 | 0.026 | 0.0009 | 16.1 | 12.3 | 0.010 | 0.089 | 2.20 | | | XX (50%) |
| | O | 0.054 | 0.11 | 1.85 | 0.024 | 0.0009 | 16.9 | 12.8 | 0.010 | 0.092 | 2.63 | | 0.37V | XX (50%) |

*Outside the range of the present invention
XX: Conventional, % in parentheses means the degree of working 150 kg of each of the steels having the compositions shown in Table 1 were melted using a vacuum induction melting furnace and cast into ingots. Soaking was then performed for 4 hours at 1200° C., after which hot forging was carried out at 1000° C. or above to obtain a plate with a thickness of 35 mm and a width of 100 mm. Solid solution treatment was then carried out by holding for 20 minutes at 1000° C. followed by water cooling.

For the steels according to the present invention, the water-cooled plates were subjected to cold rolling of 30%, after which cold rolling of 10% was carried out in the direction perpendicular to the previous direction of working (manufacturing method A), or the water-cooled plates were subjected to cold rolling of 40% and then to cold rolling of 10% in the For comparative steels B-G, after the above-described hot forging and solid solution treatment, cold rolling of 10-65% in a single direction was carried out to obtain test materials.

For comparative steels H-K, test materials were obtained by the above-described manufacturing method B.

For comparative steels L and M, after hot forging and solid solution treatment, cold rolling of 40% was carried out in a single direction to obtain test materials.

For comparative steels N and O, after hot forging and solid solution treatment, cold rolling of 50% was carried out in a single direction to obtain test materials.

From each of the test materials obtained in this manner, tensile test pieces with a diameter of 4 mm and GL of 20 mm, hydrogen gas environment tensile test pieces with a diameter of 2.54 mm and GL of 30 mm, and Charpy impact test pieces measuring 10 mm×10 mm×55 mm with a 2-mm V-notch were cut in the direction of final cold rolling (namely, in the direction of the final plastic deformation of the test materials). A tensile test was carried out at room temperature in air, and a tensile test under a hydrogen gas atmosphere was carried out at room temperature in high pressure hydrogen gas at 70 MPa. Both were carried out at a strain rate of $10^{-6}$/second, and the results of steels according to the present invention and comparative steels were compared.

The results are shown in Table 2.

In contrast, steels of the present invention of Nos. 1-32 of Table 2 each had an x-ray integrated intensity I(111) of a cross section in the direction perpendicular to the direction of working (a cross section perpendicular to the direction of working) of at most 5 times that in a random direction, and the x-ray integrated intensity ratio I(220)/I(111) of a cross section in the direction of working (a working direction cross section) of at most 10. The strength TS at room temperature was at least 800 MPa, YS was at least 400 MPa, and elongation was at least 30%. In addition, susceptibility to hydrogen embrittle-

TABLE 2

| Steel | | X-ray Intensity (111) to Random Direction | X-ray Integrated Intensity Ratio (220)/(111) | TS (MPa) | YS (MPa) | Elongation (%) | Elongation (hydrogen)/ Elongation (air) |
|---|---|---|---|---|---|---|---|
| Present Invention | 1 | 2.4 | 4.1 | 848 | 448 | 45.7 | 0.94 |
| | 2 | 3.8 | 7.3 | 1072 | 487 | 38.9 | 0.83 |
| | 3 | 3.5 | 6.6 | 1042 | 512 | 42.2 | 0.89 |
| | 4 | 4.6 | 9.5 | 1328 | 572 | 31.8 | 0.79 |
| | 5 | 4.6 | 9.2 | 1248 | 604 | 34.9 | 0.79 |
| | 6 | 3.5 | 6.8 | 1086 | 479 | 40.0 | 0.85 |
| | 7 | 4.4 | 9.1 | 1327 | 562 | 33.0 | 0.78 |
| | 8 | 3.7 | 7.2 | 1075 | 447 | 42.0 | 0.81 |
| | 9 | 3.9 | 7.6 | 1142 | 478 | 37.6 | 0.80 |
| | 10 | 2.8 | 5.2 | 948 | 455 | 46.1 | 0.87 |
| | 11 | 4.2 | 8.3 | 1159 | 470 | 37.2 | 0.81 |
| | 12 | 3.9 | 7.6 | 1122 | 488 | 37.0 | 0.80 |
| | 13 | 2.8 | 5.2 | 946 | 448 | 42.3 | 0.90 |
| | 14 | 3.5 | 6.7 | 1062 | 438 | 40.4 | 0.88 |
| | 15 | 3.1 | 5.9 | 1000 | 448 | 40.6 | 0.89 |
| | 16 | 2.5 | 4.5 | 858 | 457 | 46.9 | 0.92 |
| | 17 | 3.2 | 6.1 | 1025 | 461 | 39.8 | 0.83 |
| | 18 | 2.7 | 5.0 | 914 | 459 | 45.1 | 0.93 |
| | 19 | 3.6 | 7.0 | 1082 | 462 | 38.2 | 0.81 |
| | 20 | 2.9 | 5.3 | 926 | 446 | 46.0 | 0.87 |
| | 21 | 3.9 | 7.6 | 1131 | 454 | 39.7 | 0.82 |
| | 22 | 4.3 | 8.4 | 1172 | 479 | 35.7 | 0.84 |
| | 23 | 2.8 | 5.2 | 931 | 450 | 46.7 | 0.88 |
| | 24 | 4.3 | 8.4 | 1159 | 475 | 38.9 | 0.83 |
| | 25 | 3.1 | 5.7 | 977 | 491 | 45.0 | 0.91 |
| | 26 | 3.8 | 7.4 | 1130 | 463 | 37.7 | 0.86 |
| | 27 | 4.0 | 7.8 | 1149 | 468 | 37.9 | 0.81 |
| | 28 | 3.0 | 5.7 | 981 | 441 | 44.0 | 0.86 |
| | 29 | 4.0 | 7.7 | 1099 | 438 | 40.9 | 0.83 |
| | 30 | 4.3 | 8.6 | 1224 | 592 | 35.6 | 0.82 |
| | 31 | 4.7 | 9.4 | 1257 | 586 | 34.2 | 0.79 |
| | 32 | 4.8 | 9.6 | 1372 | 606 | 31.6 | 0.76 |
| Comparative | A | 1.1 | 1.2 | 561 | 285 | 48.3 | 0.99 |
| | B | 2.3 | 2.8 | 703 | 362 | 36.8 | 0.89 |
| | C | 3.3 | 4.9 | 806 | 409 | 27.4 | 0.82 |
| | D | 4.2 | 8.7 | 884 | 428 | 20.3 | 0.76 |
| | E | 5.4 | 16.5 | 948 | 448 | 13.7 | 0.42 |
| | F | 6.5 | 18.7 | 1030 | 495 | 10.9 | 0.38 |
| | G | 7.6 | 19.8 | 1105 | 487 | 7.4 | 0.31 |
| | H | 3.5 | 6.7 | 1024 | 425 | 15.3 | 0.90 |
| | I | 3.2 | 6.0 | 986 | 445 | 44.4 | 0.62 |
| | J | 3.7 | 7.1 | 1075 | 420 | 21.6 | 0.83 |
| | K | 4.1 | 8.1 | 1148 | 490 | 16.7 | 0.85 |
| | L | 6.5 | 12.0 | 948 | 451 | 18.2 | 0.45 |
| | M | 6.0 | 11.6 | 854 | 443 | 19.5 | 0.49 |
| | N | 7.1 | 16.3 | 1072 | 467 | 13.6 | 0.38 |
| | O | 7.3 | 17.0 | 1168 | 476 | 11.2 | 0.34 |

As can be seen from the results of comparative steels A-G of Table 2, when strength was increased by cold working, ductility greatly decreased. When a necessary degree of cold working to achieve the room temperature tensile strength (TS) of at least 800 Mpa was applied, the x-ray integrated intensity I(111) of a cross section perpendicular to the direction of working was over 5 times that of a random direction, and the x-ray integrated intensity ratio I(220)/I(111) of a cross section in the direction of working exceeded 10. In such a case, resistance to hydrogen embrittlement greatly decreases, and this becomes a major problem in actual use.

ment which was evaluated by the ratio of the ductility in a tensile test in a hydrogen gas environment to that in a tensile test in air was extremely low.

In comparative steels H-O their chemical compositions were outside the range for the steels of the present invention, or the degree of formation of the texture structure was such that the x-ray integrated intensity I(111) of a cross section perpendicular to the direction of working was greater than 5 times that of a random direction, or the x-ray integrated intensity ratio I(220)/I(111) of a cross section in the direction of working was greater than 10. The susceptibility to hydrogen embrittlement as evaluated by the ratio of the ductility in a tensile test in a hydrogen gas atmosphere to the ductility in a tensile test in air was extremely high.

In this example, cold rolling was carried out twice on a plate in different directions of working, but the same effects as in this example can be obtained when carrying out cold rolling two times in different directions of working on a steel pipe (such as pipe forming by cold drawing and pipe expansion with a plug).

Figure 6:
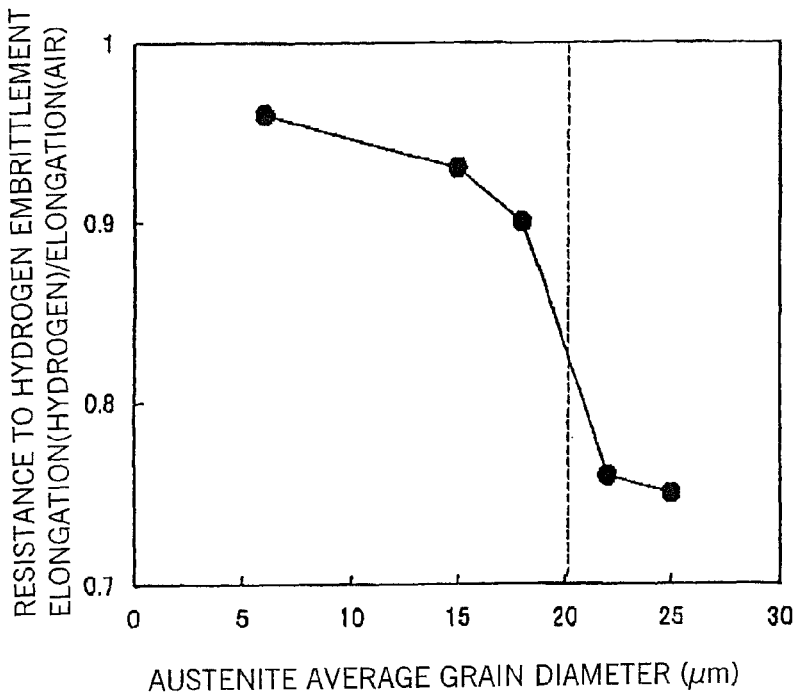
FIG. 6 is a view showing the relationship between grain diameter and resistance to hydrogen embrittlement in examples.

FIG. 6 shows the results of evaluation of susceptibility to hydrogen embrittlement when solid solution heat treatment was carried out at various temperatures in the range of 950-1150° C. (30 minutes of holding followed by water cooling) after hot forging of inventive steel No. 6 of Table 1, after which above-described manufacturing method A was performed and test materials having various grain sizes were prepared. Susceptibility to hydrogen embrittlement was evaluated in the same manner as with the above-described evaluation based on the ratio of the ductility in a tensile test in a hydrogen gas atmosphere to the ductility in a tensile test in air. As can be seen from the results shown in FIG. 6, by making the austenite average grain diameter at most 20 μm, susceptibility to hydrogen embrittlement becomes extremely low.

INDUSTRIAL APPLICABILITY

According to the present invention, an austenitic stainless steel can be provided which has excellent mechanical properties (strength and ductility) and corrosion resistance for use as a component of structural equipment which is exposed to high pressure hydrogen gas, specifically which is used in a hydrogen environment such as in a fuel cell automobile or a hydrogen gas station.

The invention claimed is:

1. In a method of storing hydrogen gas at a pressure of 70 MPa or more, wherein the hydrogen gas is in contact with one or more materials when stored, the improvement comprising improving the resistance to hydrogen embrittlement of at least one material in contact with the hydrogen gas during the storing step by making the at least one material from an austenitic stainless steel having a chemical composition containing, in mass percent, C: at most 0.10%, Si: at most 0.47%, Mn: 0.89-30%, P: at most 0.040%, S: at most 0.01%, Cr: 15-30%, Ni: 5.0-30%, sol. Al: at most 0.10%, N: 0.001-0.30%, and a remainder of Fe and impurities, and by having a structure such that the x-ray integrated intensity I(111) of a cross section in a direction perpendicular to the direction of working is at most 5 times that of a random direction and such that the x-ray integrated intensity ratio I(220)/I(111) of a cross section in the direction of working is at most 10 to indicate a low anisotropy for the structure, the steel having a tensile strength of 800 MPa or higher, an elongation of 30% or more, and a susceptibility to hydrogen embrittlement indicated by elongation (hydrogen)/elongation (air) is more than 0.75.

2. The method as set forth in claim 1 wherein the chemical composition further contains, in mass percent, at least one of Mo: 0.3-3.0% and W: 0.3-6.0%.

3. The method as set forth in claim 1 wherein the chemical composition further contains, in mass percent, at least one of V: 0.001-1.0%, Nb: 0.001-1.0%, Ta: 0.001-1.0%, Ti: 0.001-1.0%, Zr: 0.001-1.0%, and Hf: 0.001-1.0%.

4. The method as set forth in claim 2 wherein the chemical composition further contains, in mass percent, at least one of V: 0.001-1.0%, Nb: 0.001-1.0%, Ta: 0.001-1.0%, Ti: 0.001-1.0%, Zr: 0.001-1.0%, and Hf: 0.001-1.0%.

5. The method as set forth in claim 3 wherein the chemical composition further contains, in mass percent, at least one of Nb: greater than 0.20% not greater than 1.0%, Ta: greater than 0.40% not greater than 1.0%, and Ti: greater than 0.10% not greater than 1.0%, and wherein C+N is ≤0.05%.

6. The method as set forth in claim 4 wherein the chemical composition further contains, in mass percent, at least one of Nb: greater than 0.20% not greater than 1.0%, Ta: greater than 0.40% not greater than 1.0%, and Ti: greater than 0.10% not greater than 1.0%, and wherein C+N is ≤0.05%.

7. The method as set forth in claim 1 wherein the chemical composition further contains, in mass percent, 0.0001-0.020% of B.

8. The method as set forth in claim 2 wherein the chemical composition further contains, in mass percent, 0.0001-0.020% of B.

9. The method as set forth in claim 3 wherein the chemical composition further contains, in mass percent, 0.0001-0.020% of B.

10. The method as set forth in claim 4 wherein the chemical composition further contains, in mass percent, 0.0001-0.020% of B.

11. The method as set forth in claim 5 wherein the chemical composition further contains, in mass percent, 0.0001-0.020% of B.

12. The method as set forth in claim 6 wherein the chemical composition further contains, in mass percent, 0.0001-0.020% of B.

13. The method as set forth in claim 7 wherein the chemical composition further contains, in mass percent, at least one of Cu: 0.3-2.0% and Co: 0.3-5.0%.

14. The method as set forth in claim 1 wherein the chemical composition further contains, in mass percent, at least one of Mg: 0.0001-0.0050%, Ca: 0.0001-0.0050%, La: 0.0001-0.20%, Ce: 0.0001-0.20%, Y: 0.0001-0.40%, Sm: 0.0001-0.40%, Pr: 0.0001-0.40%, and Nd: 0.0001-0.50%.

15. The method as set forth in claim 1 characterized in that the austenite average grain diameter is at most 20 μm.

16. The method as set forth in claim 14 characterized in that the austenite average grain diameter is at most 20 μm.

17. The method as set forth in claim 1, wherein at least one material is at least part of one or more of a gas cylinder, piping, and a valve.

* * * * *